United States Patent
Yu et al.

(10) Patent No.: US 7,545,716 B2
(45) Date of Patent: Jun. 9, 2009

(54) OPTICAL DISC DRIVE AND RELATED METHOD OF DETERMINING OPTIMUM WRITE POWER FOR WRITING DATA TO OPTICAL DISC

(75) Inventors: Chih-Ching Yu, Tao-Yuan Hsien (TW); Yu-Chun Lin, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 595 days.

(21) Appl. No.: 11/306,500

(22) Filed: Dec. 30, 2005

(65) Prior Publication Data
US 2007/0153649 A1    Jul. 5, 2007

(51) Int. Cl.
*G11B 7/00*    (2006.01)
(52) U.S. Cl. .................... 369/47.53; 369/53.34
(58) Field of Classification Search ............. None
See application file for complete search history.

(56) References Cited

U.S. PATENT DOCUMENTS

| | | | |
|---|---|---|---|
| 6,269,062 B1 * | 7/2001 | Minemura et al. | 369/47.53 |
| 6,463,020 B2 | 10/2002 | Minemura et al. | |
| 7,133,344 B2 | 11/2006 | Yano | |
| 2003/0039188 A1 * | 2/2003 | Fukuchi et al. | 369/47.53 |
| 2004/0008594 A1 * | 1/2004 | Tokita et al. | 369/47.53 |
| 2004/0114482 A1 * | 6/2004 | Yano et al. | 369/47.52 |
| 2004/0136303 A1 * | 7/2004 | Watanabe et al. | 369/53.36 |
| 2004/0145993 A1 * | 7/2004 | Kurebayashi et al. | 369/53.37 |
| 2005/0052969 A1 | 3/2005 | Lee | |
| 2005/0128910 A1 * | 6/2005 | Lin et al. | 369/47.53 |
| 2005/0169139 A1 * | 8/2005 | Kakimoto et al. | 369/47.53 |
| 2005/0232106 A1 * | 10/2005 | Langereis | 369/47.53 |
| 2005/0243670 A1 * | 11/2005 | Kakimoto et al. | 369/47.53 |
| 2005/0249074 A1 * | 11/2005 | Yanagawa | 369/47.53 |
| 2006/0072410 A1 * | 4/2006 | Ogawa | 369/47.53 |
| 2006/0285459 A1 * | 12/2006 | Van Endert | 369/47.53 |

FOREIGN PATENT DOCUMENTS

WO    WO 2004/047090 A1    6/2004

\* cited by examiner

*Primary Examiner*—Peter Vincent Agustin
(74) *Attorney, Agent, or Firm*—Winston Hsu

(57) ABSTRACT

A method for determining an optimum write power for writing data to an optical disc is disclosed. The method includes utilizing a plurality of candidate write powers for writing data to the optical disc; measuring at least a writing quality parameter corresponding to each of the candidate write powers, respectively; determining a characteristic curve of the writing quality parameters to the candidate write powers; and determining the optimum write power according to a write power corresponding to a target inflection point of the characteristic curve.

19 Claims, 7 Drawing Sheets

OPTICAL DISC DRIVE AND RELATED METHOD OF DETERMINING OPTIMUM WRITE POWER FOR WRITING DATA TO OPTICAL DISC

BACKGROUND

The present invention relates to controlling optimum write power, and more particularly, to a method and optical disc drive capable of utilizing an inflection point of a characteristic curve of writing quality parameters to write powers to determine the optimum write power.

More recently, writable optical disc drives, such as common DVD-R/RW, DVD+R/RW, or DVD-RAM drives, for use with computer systems, have become widely available to individuals. As a result, the need to improve performance of these devices has increased considerably.

Generally, determining the optimum write power of above drives requires an optimum power control (OPC) procedure before data recording or a running optimum power control (ROPC) procedure during the data recording. As to the OPC procedure, many related art methods are utilized to determine the optimum write power. Please refer to FIG. 1. FIG. 1 is a diagram illustrating two characteristic curves, C1 and C2, of reflection difference $M_{14}$ to write power according to the related art. As defined in optical disc specifications, $M_{14}$ represents the reflection difference between a 14T pit and 14T land. $M_{14}$ is the maximum amplitude of vibration in the RF signal. Therefore, a characteristic curve of reflection difference $M_{14}$ and write power can be used to determine the optimum write power. As shown in FIG. 1, the characteristic curve C1 has a saturation region and a point $A_1$ at the saturation region. Therefore, for an optical disc having a characteristic curve M1, a write power $P_S$, associated with the point $A_1$ and close to the optimum write power $P_O$, is accordingly determined to be the write power used for recording data. Assume the inserted optical disc corresponds to the characteristic curve C2 shown in FIG. 1. It is clear that the characteristic curve C2 has no saturation region. Using the reflection difference $M_{14}$ fails to obtain suitable write power applied for recording user data to an optical disc having the characteristic curve C2.

As known to those skilled in this art, if the found optimum write power is higher than a normal optimum write power applied to a rewritable optical disc, the allowable times of rewriting data to the rewritable optical disc are greatly reduced, shortening the rewritable optical disc's life. Therefore, how to properly find the desired optimum write power becomes an important issue for designers.

SUMMARY OF THE INVENTION

It is therefore one of the objectives of the claimed invention to provide a method and optical disc drive capable of utilizing an inflection point of a characteristic curve of writing quality parameters to write powers to determine the target optimum write power, to solve the above-mentioned problems.

According to an embodiment of the present invention, a method for determining an optimum write power for writing data to an optical disc is disclosed. The method comprises: utilizing a plurality of candidate write powers for writing data to the optical disc; measuring at least a writing quality parameter corresponding to each of the candidate write powers, respectively; determining a characteristic curve of the writing quality parameters to the candidate write powers; and determining the optimum write power according to a write power corresponding to a target inflection point of the characteristic curve.

In addition, according to an embodiment of the present invention, an optical disc drive capable of determining an optimum write power for writing data to an optical disc is disclosed. The optical disc drive comprises: an optical pickup unit, utilizing a plurality of candidate write powers to write data to the optical disc; a measuring module, coupled to the optical pickup unit, for measuring at least a writing quality parameter corresponding to each of the candidate write powers, respectively; and a write power controller, coupled to the optical pick-up head and the measuring module, for controlling the optical pickup unit to write data to the optical disc utilizing the candidate write powers, determining a characteristic curve of writing quality parameters to the candidate write powers, and determining the optimum write power according to a write power corresponding to a target inflection point of the characteristic curve The present invention provides a method to find the optimum write power according to an inflection point of a characteristic curve of writing quality parameters (jitter, bit error rate, etc.) to write powers. The present invention utilizing the characteristic curve of writing quality parameters to write powers can obtain an adequate write power for recording user data to the optical disc, regardless of whether the write strategy for an optical disc is adjusted. In addition, the found target write power does not significantly exceed the desired optimum write power. Therefore, the method can give consideration not only to write quality but also to the overwriting times of the rewritable optical disc.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
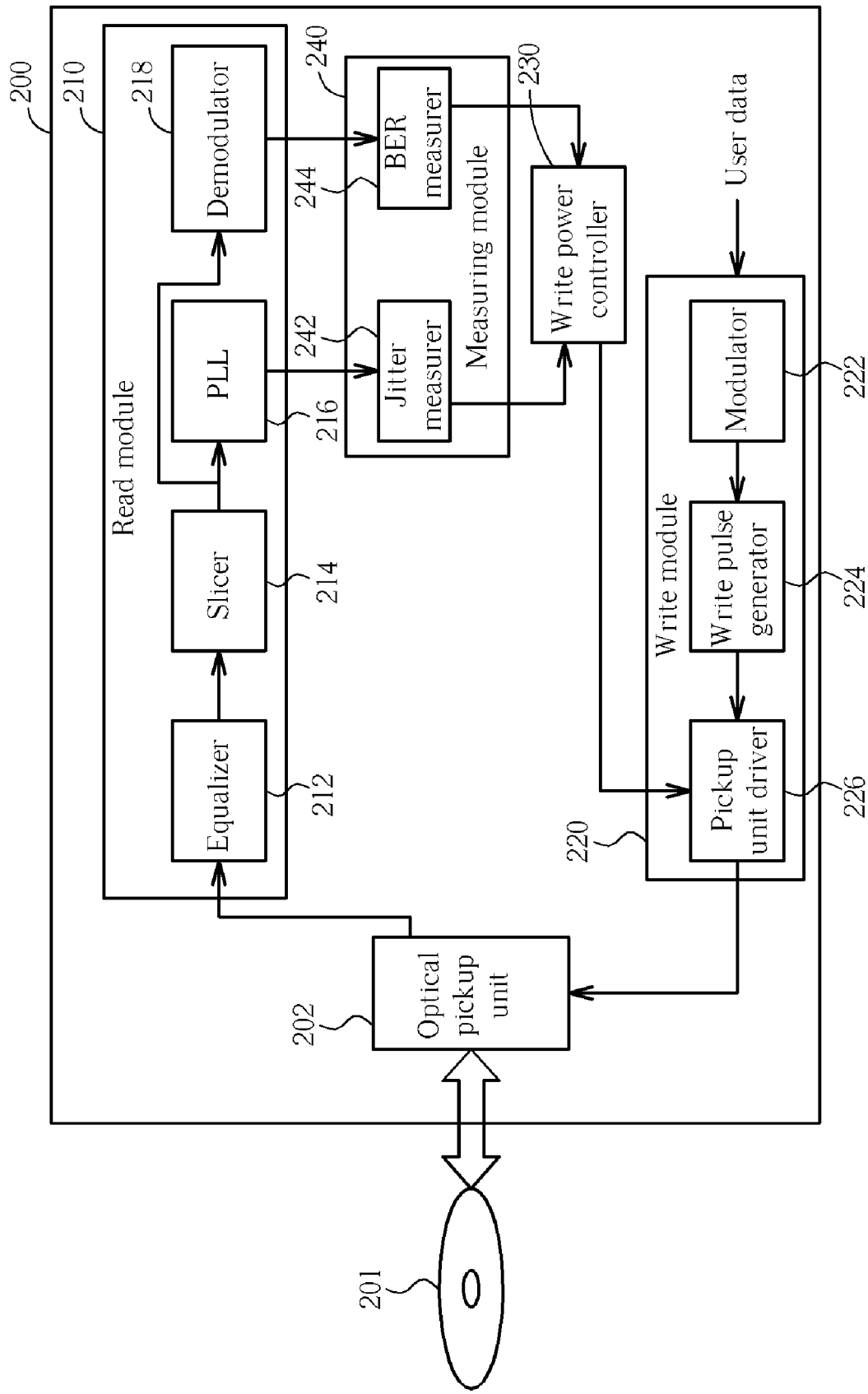
FIG. 2 is a block diagram illustrating an optical disc drive according to an embodiment of the present invention.

Please refer to FIG. 2. FIG. 2 is a block diagram illustrating an optical disc drive 200 according to an embodiment of the present invention. The optical disc drive 200 is used to access an optical disc 201, which is a writable optical disc complying with CD, DVD, Blu-ray Disc (BD) or HD-DVD specification. The optical disc drive 200 comprises an optical pickup unit 202 for accessing the optical disc 201, a read module 210 for extracting information recorded on the optical disc 201, a write module 220 for writing the user data onto the optical disc 201, a write power controller 230 for controlling the write power emitting from the optical pickup unit 202, and a measuring module 240 for measuring write quality parameters used by the write power controller 230. The optical pickup unit 202 reads the data stored on the optical disc 201 and generates RF signals. The equalizer 212 equalizes the RF signals, and the equalized RF signals are sliced by the slicer 214 using a specific slice level. The slicer 214 outputs the digitized data to the following phase-locked loop (PLL) 216 and the demodulator 218. The PLL 216 locks a wobble clock of a predetermined frequency according to the wobble data read from wobble tracks of the optical disc 201, where the wobble clock could be further frequency-divided to generate clock signals needed by other circuit components in the optical disc drive 600. The demodulator 218 is responsible for demodulating the user data read from data tracks of the optical disc 201.

As shown in FIG. 2, the measuring module 240 includes a jitter measurer 242 and a bit error rate (BER) measurer 244. In this embodiment, jitter or bit error rate is used as a writing quality parameter. Please note that using the jitter or bit error rate as a writing quality parameter is meant to be taken as an example, and is not meant to be taken as a limitation. The jitter measurer 242 is used to measure jitter associated with each of the applied write powers $P_1$-$P_n$ when the jitter acts as the writing quality parameter, while BER measurer 244 is used to measure bit error rate associated with each of the applied write powers $P_1$-$P_n$ when the bit error rate acts as the writing quality parameter.

The write power controller 230 controls the optical pickup unit 602 to emit the write powers $P_1$-$P_n$ used for determining the target write power, and then receives the write quality parameters from the jitter measurer 242 or the BER measurer 244. In addition, the write power controller 230 performs the method of determining the optimum write power to get the target write power used for recording user data to the optical disc 201. As shown in FIG. 2, the raw user data is first modulated by the modulator 222 in the write module 220. The write pulse generator 224 then generates write pulses to the pickup unit driver 226 according to the modulated data (i.e. EFM data). In the end, the write power determined by the write power controller 230 is referenced by the pickup unit driver 226 to drive the optical pickup unit 202 to emit proper write power to the optical disc 201. The optical disc drive 200 is used to performing methods of the present invention for obtaining an optimum write power, and further description is detailed as follows.

Figure 3:
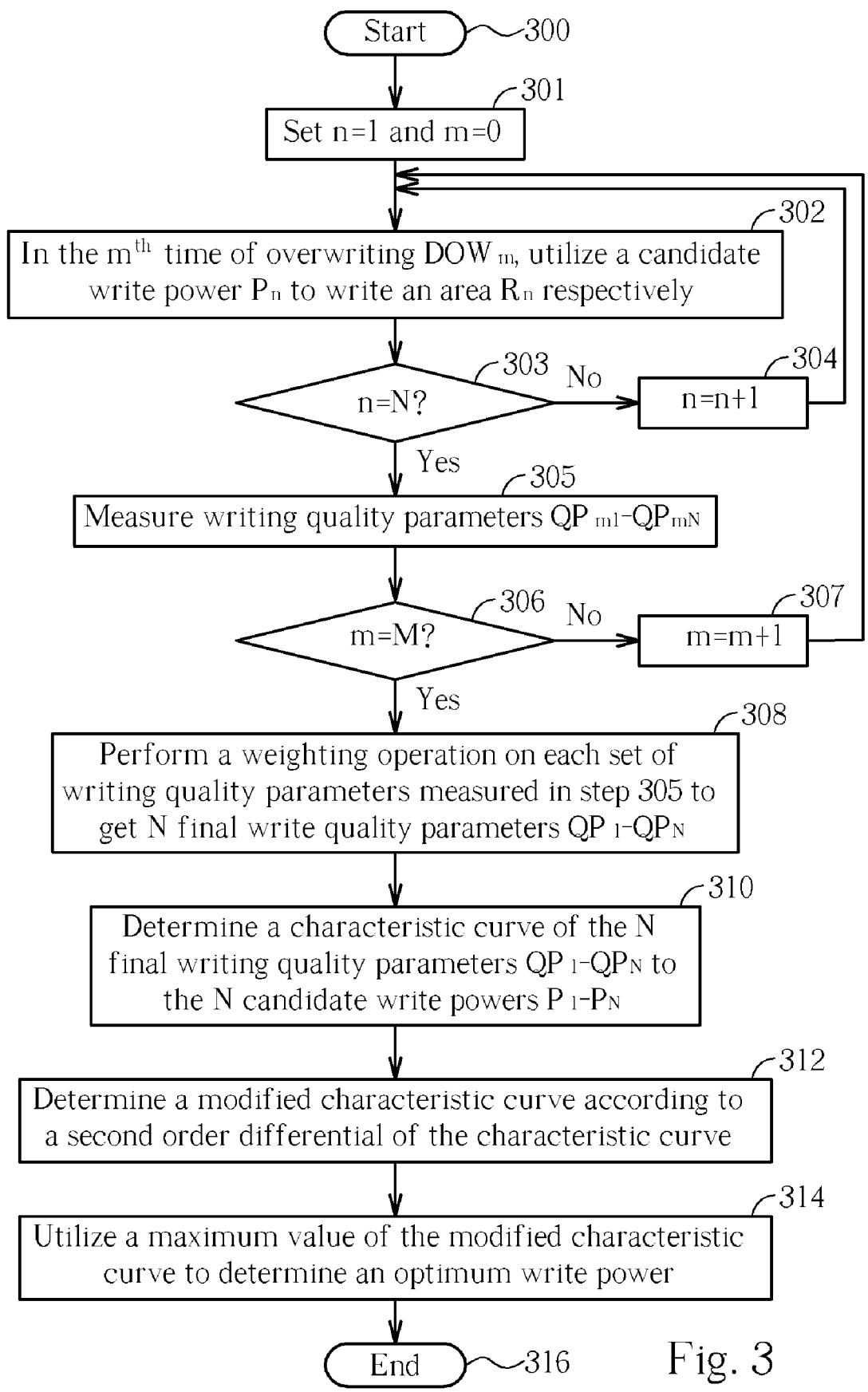
FIG. 3 is a flowchart illustrating a first embodiment of determining an optimum write power for an optical disc according to an embodiment of the present invention.

Please refer to FIG. 3. FIG. 3 is a flowchart illustrating a first embodiment of determining an optimum write power for an optical disc 201 according to the present invention. In this embodiment, the rewritable optical disc is complied with CD, DVD, Blu-ray Disc (BD) or HD-DVD specifications. However, the first embodiment of the present invention is not limited to the above listed disc types. The operation of determining an optimum write power includes the following steps:

Step 300: Start.

Step 301: Set n=1 and m=0.

Step 302: In the $m^{th}$ time of overwriting $DOW_m$, utilize a candidate write power $P_n$ to write patterns to an area $R_n$ respectively on the optical disc.

Step 303: Judge whether N candidate write powers have been used to write N areas or not (n=N?). If yes, go to step 305. If no, go to step 304.

Step 304: Let n=n+1 and then proceed to step 302.

Step 305: Measure a plurality of writing quality parameters $QP_{m1}$-$QP_{mN}$ corresponding to the patterns written on the areas $R_1$-$R_N$ by write powers $P_1$-$P_N$ in the $m_{th}$ time of overwriting $DOW_m$.

Step 306: Judge whether the areas $R_1$-$R_N$ have been overwritten for a predetermined number of times M (m=M?). If yes, go to step 308; otherwise, go to step 307.

Step 307: Let m=m+1 and then proceed to step 302.

Step 308: Perform a weighting operation on $n^{th}$ set of writing quality parameters $QP_{0n}$-$QP_{Mn}$ corresponding to the same area $R_n$ for determining a final write quality parameter $QP_n$ of the candidate write power $P_n$. After counting all N sets of writing quality parameters, get N final write quality parameters $QP_1$-$QP_N$.

Step 310: Determine a characteristic curve of the N final writing quality parameters $QP_1$-$QP_N$ to the N candidate write powers $P_1$-$P_N$.

Step 312: Determine a modified characteristic curve according to a second order differential of the characteristic curve.

Step 314: Utilize a maximum value of the modified characteristic curve to determine an optimum write power.

Step 316: End.

The step of determining an optimum write power is detailed as follows. In this first embodiment, a plurality of write powers $P_1$-$P_n$ are tested and the writing quality after several overwriting times is also considered. At the beginning, set the times of directly overwriting (DOW) equal to 0, $DOW_m$=$DOW_0$, (steps 300 and 301). In the present invention, the first time of optical disc drive 200 to write patterns on the areas is called $DOW_0$, and the first time of directly overwriting is called $DOW_1$. In the $m^{th}$ overwriting of area $R_1$-$R_N$, the write power controller 230 controls the pickup unit driver 226 to use a predetermined candidate write power $P_n$ to write patterns onto a area $R_n$ respectively (step 302). The patterns wrote onto the area could be the special test data or normal user data. Until the write power controller 230 controls the pickup unit driver 226 to use all N candidate write powers to wrote patterns onto all N areas, the next step won't be proceed. For example, fifteen different write powers are adopted to write fifteen areas on the optical disc (steps 303 and 304). In one embodiment, the relationship between the candidate powers is that the $P_{n+1}$=$P_n$+Δ, wherein Δ is a predetermined common difference. In another embodiment, there is no rule between the candidate write powers; they are just N different values.

In the $m^{th}$ overwriting, after all the N candidate powers have been adopted, the measuring module 240 measures a plurality of writing quality parameters of each areas $R_1$-$R_N$. That is, the writing quality parameters $QP_{m1}$-$QP_{mN}$ corresponding to the applied write powers $P_1$-$P_N$ are measured in the $m^{th}$ overwriting. In this embodiment, jitter or bit error rate is used as the kind of writing quality parameter (step 305). As mentioned above, using jitter or bit error rate as a writing quality parameter is merely meant to be an example. In other embodiments, the pit/land length on the optical disc may be used as the writing quality parameter.

After measuring the writing quality parameter of the $m^{th}$ overwriting of each area, the above steps would be repeated until a predetermined number of times, M, of overwriting has been achieved (from $DOW_1$ to $DOW_M$). Then, N set of writing quality parameters corresponding to area $R_1$-$R_N$ would be obtained (steps 306 and 307). Each set of writing quality parameters comprises M+1 writing quality parameters $QP_{0n}$-$QP_{Mn}$ corresponding to each time of overwriting. For example, the first set of writing quality parameters corresponding to first area $R_1$, which also corresponding to the first candidate write power $P_1$, comprises M+1 writing quality parameters $QP_{01}$-$QP_{M1}$. The second set comprises $QP_{02}$-$QP_{M2}$, the third set comprises $QP_{03}$-$QP_{M3}$, etc.

After obtaining N sets of writing quality parameters, in this embodiment, a weighting operation will be applied. The M+1 writing quality parameters of each set will be multiplied by M+1 weighting factors to get N final writing quality parameters $QP_1$-$QP_N$ (step 308). The weighting equation is listed in equation (1) below.

$$QP_n = k_0 \times QP_{0n} + k_1 \times QP_{1n} + \ldots + k_m \times QP_{mn} + \ldots + k_{(M-1)} \times QP_{(M-1)n} + k_M \times QP_{Mn} \quad (1)$$

In the above equation (1), $k_0, k_1, \ldots, k_M$ represent weighting factors. The value of the weighting factor is greater or equal to zero. Please note that the calculation of the final write quality parameter $QP_1$ is not limited to using all of the measured write quality parameters $QP_{0n}$-$QP_{Mn}$. For example, four of the measured write quality parameters $QP_{0n}$, $QP_{2n}$, $QP_{4n}$, and $QP_{Mn}$ are selected to compute the final write quality parameter $QP_1$ according to the aforementioned weighting operation. Furthermore, calculation of other write quality parameters $QP_2$-$QP_N$ is identical to that of the write quality parameter $QP_1$, and further description is thus omitted for brevity.

Figure 1:
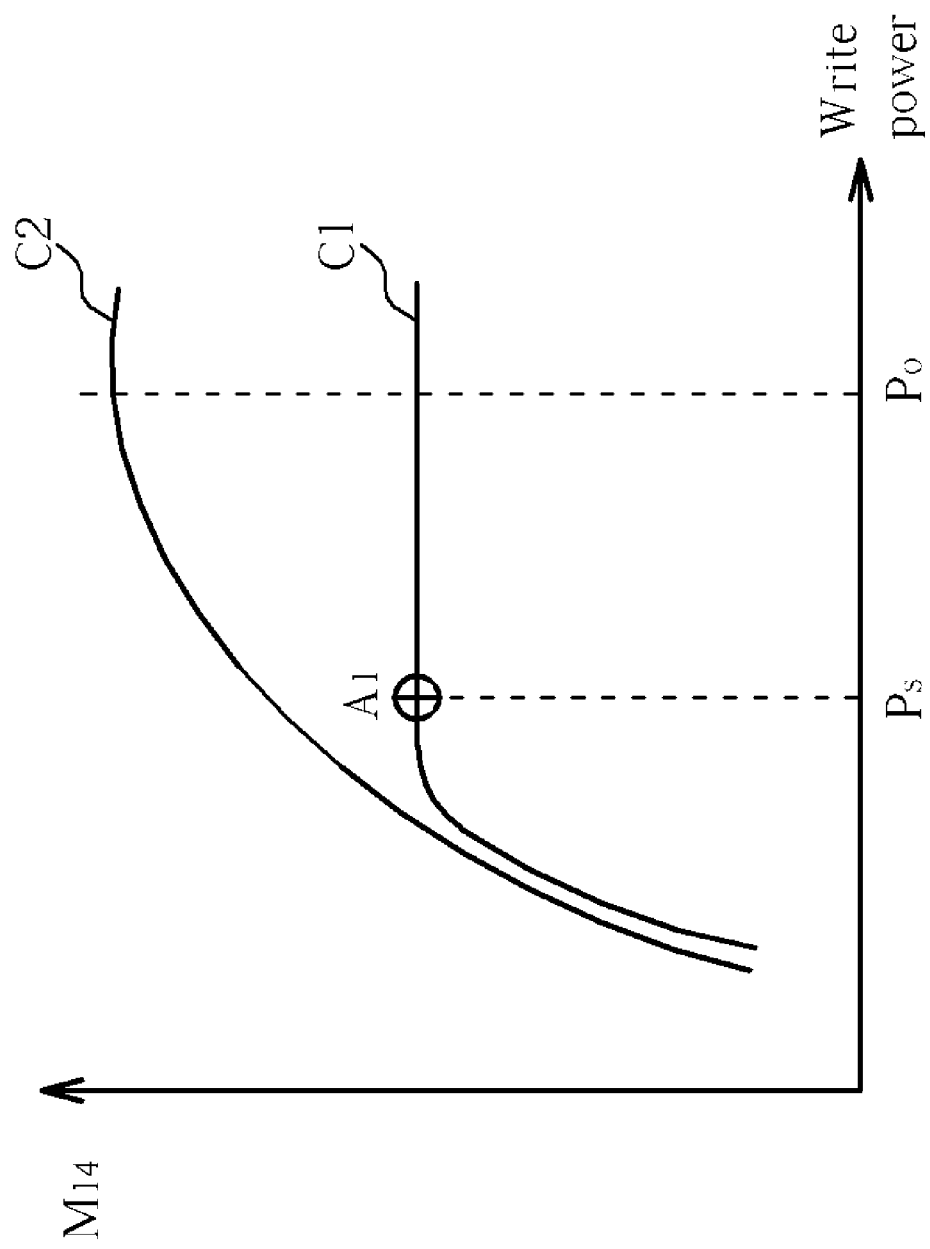
FIG. 1 is a block diagram illustrating a plurality of characteristic curves of reflection difference M14 to write power according to the related art.
Figure 4:
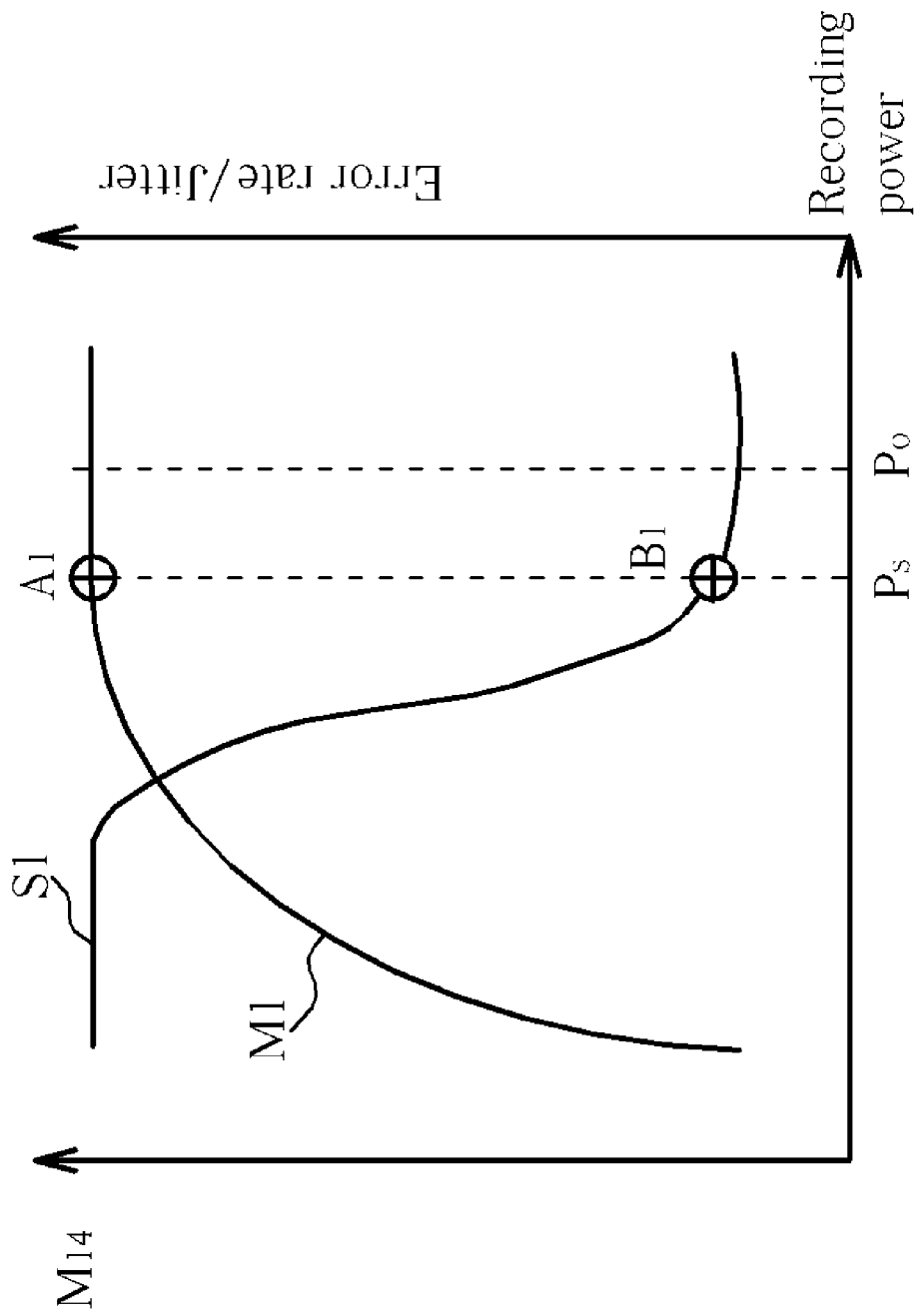
FIG. 4 is a diagram illustrating a first characteristic curve of the writing quality parameters to the write power.
Figure 5:
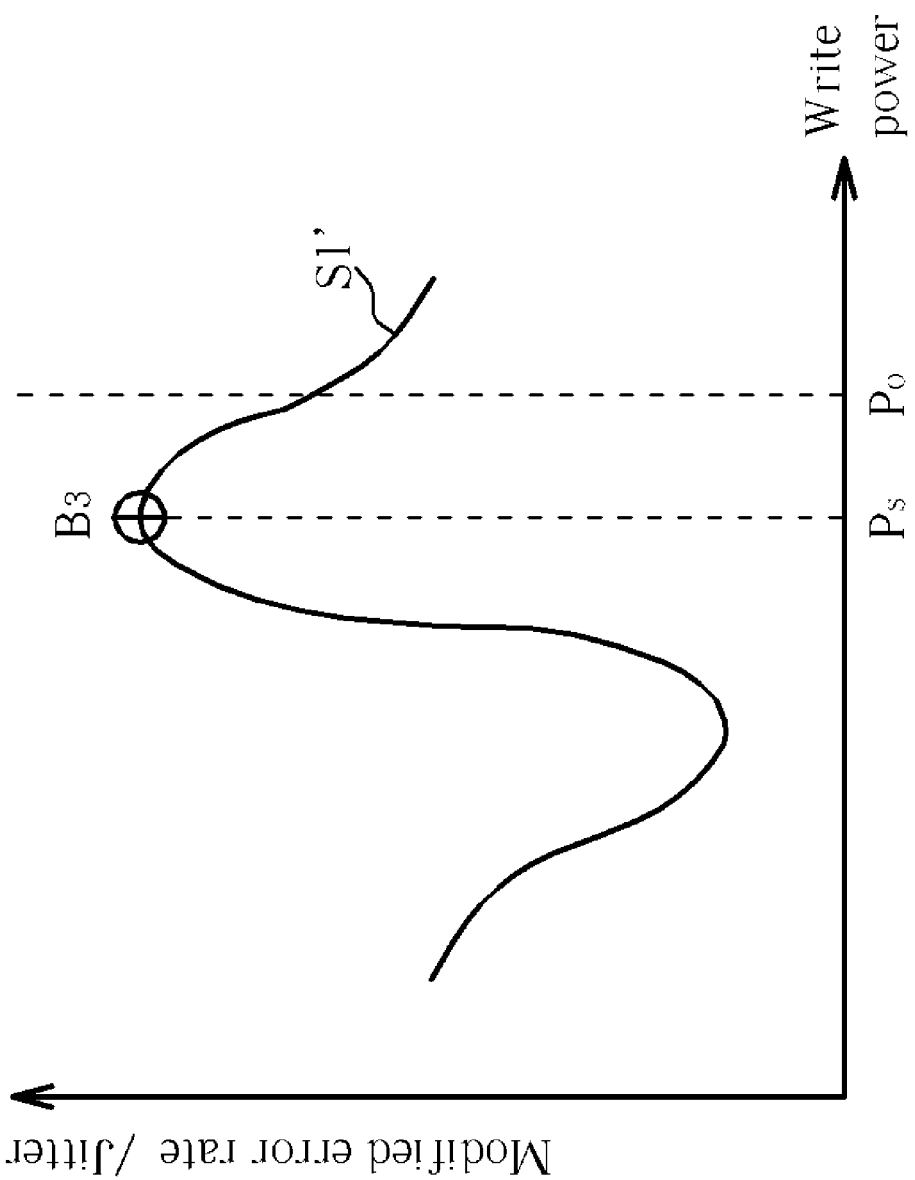
FIG. 5 is a diagram illustrating a modified characteristic curve corresponding to the characteristic curve shown in FIG. 3.

After the final writing quality parameters $QP_1$-$QP_N$ of the write powers $P_1$-$P_N$ are known, the write power controller 230 further establishes a characteristic curve of the final writing quality parameters $QP_1$-$QP_N$ to the candidate write powers $P_1$-$P_N$ by curve fitting or other means (step 310). Please refer to FIG. 4. FIG. 4 is a diagram illustrating a first characteristic curve S1 of the writing quality parameters to the candidate write powers. In this embodiment, the optical disc 201 corresponds to a characteristic curve C1 of reflection difference $M_{14}$ to write power shown in FIG. 1. The present invention determines the optimum write power $P_O$ according to a selected write power $P_S$ corresponding to a target inflection point $B_1$ of the characteristic curve S1. In other words, the present invention firstly determines a plurality of candidate inflection points of the characteristic curve S1, and then selects a candidate inflection point where the characteristic curve S1 changes from concave down to concave up to locate the target inflection point $B_1$. In order to easily find the desired inflection point $B_1$ of the characteristic curve S1, a second order differential of the characteristic curve is performed by the write power controller to get a modified characteristic curve (step 312). Please refer to FIG. 5. FIG. 5 is a diagram illustrating a modified characteristic curve S1' corresponding to the characteristic curve S1 shown in FIG. 4. As known to those skilled in the art, the maximum value of the modified characteristic curve S1', i.e. the point $B_3$ shown in FIG. 5, corresponds to the target inflection point $B_1$. Therefore, the selected write power $P_S$ associated with the point $B_3$ is quickly obtained through the modified characteristic curve S1'. In this embodiment, according to design requirements, the above-mentioned second order differential of the characteristic curve S1 could be performed in a continuous domain (differential computation) or a discrete domain (difference computation).

Please note that the selected write power $P_S$, as shown in FIG. 4 and FIG. 5, is close to the optimum write power $P_O$. In one embodiment of the present invention, the selected write power $P_S$ can be directly used as the optimum write power $P_O$ for recording user data to the optical disc. However, the present invention further provides a tuning procedure capable of finding a target write power substantially identical to the optimum write power $P_2$ by modifying the selected write power $P_S$ by a predetermined offset value $P_{offset}$ or a predetermined coefficient $C_k$, resulting in a greater power margin. The optimum write power $P_O$ obtained from the above procedure is:

$$P_O = P_S + P_{offset} \quad (2)$$

or $$P_O = C_k * P_S \quad (3)$$

Figure 6:
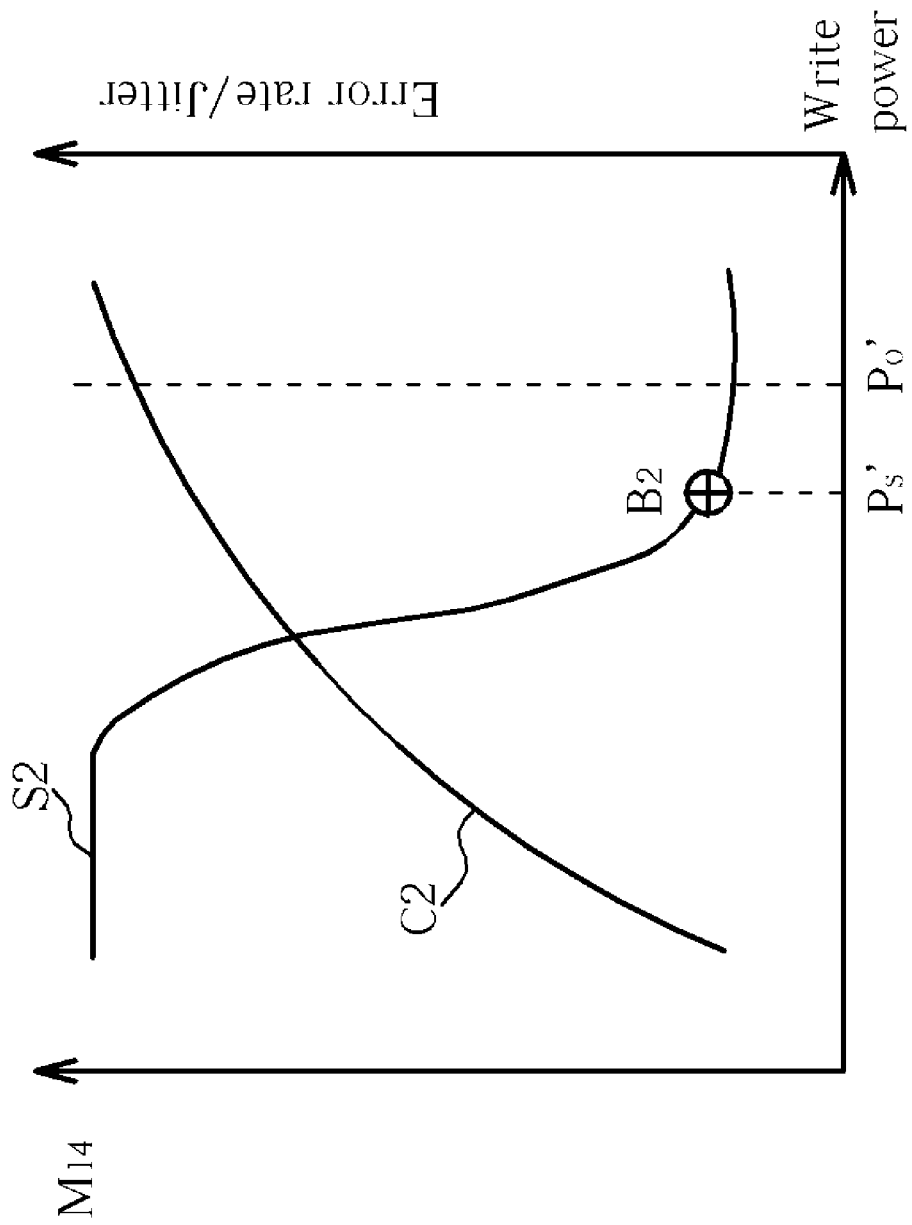
FIG. 6 is a diagram illustrating a second characteristic curve of the writing quality parameters to the write power.

As shown in FIG. 4, the selected write power $P_S$ corresponds to points $A_1$ and $B_1$. Therefore, the selected write power $P_S$ can be correctly found by utilizing the characteristic curve S1 and running the optimum power control flow of the present invention. For an optical disc corresponding to the characteristic curve C2 shown in FIG. 4, however, the present invention is also capable of determining the target write power. Please refer to FIG. 6. FIG. 6 is a diagram illustrating a second characteristic curve S2 of the writing quality parameters to the write power. According to the flow shown in FIG. 3, a selected write power $P_S'$ corresponding to the inflection point $B_2$ can be determined. In addition, referring to the equation (2) or (3), a target write power substantially identical to the optimum write power $P_O'$ is determined by properly modifying the selected write power $P_S'$ by a predetermined offset value $P_{offset}'$ or a predetermined coefficient $C_k'$. To sum up, the flow of determining the optimum write power substantially equal to the desired optimum write power can be applied to any kind of rewritable optical disc.

Figure 7:
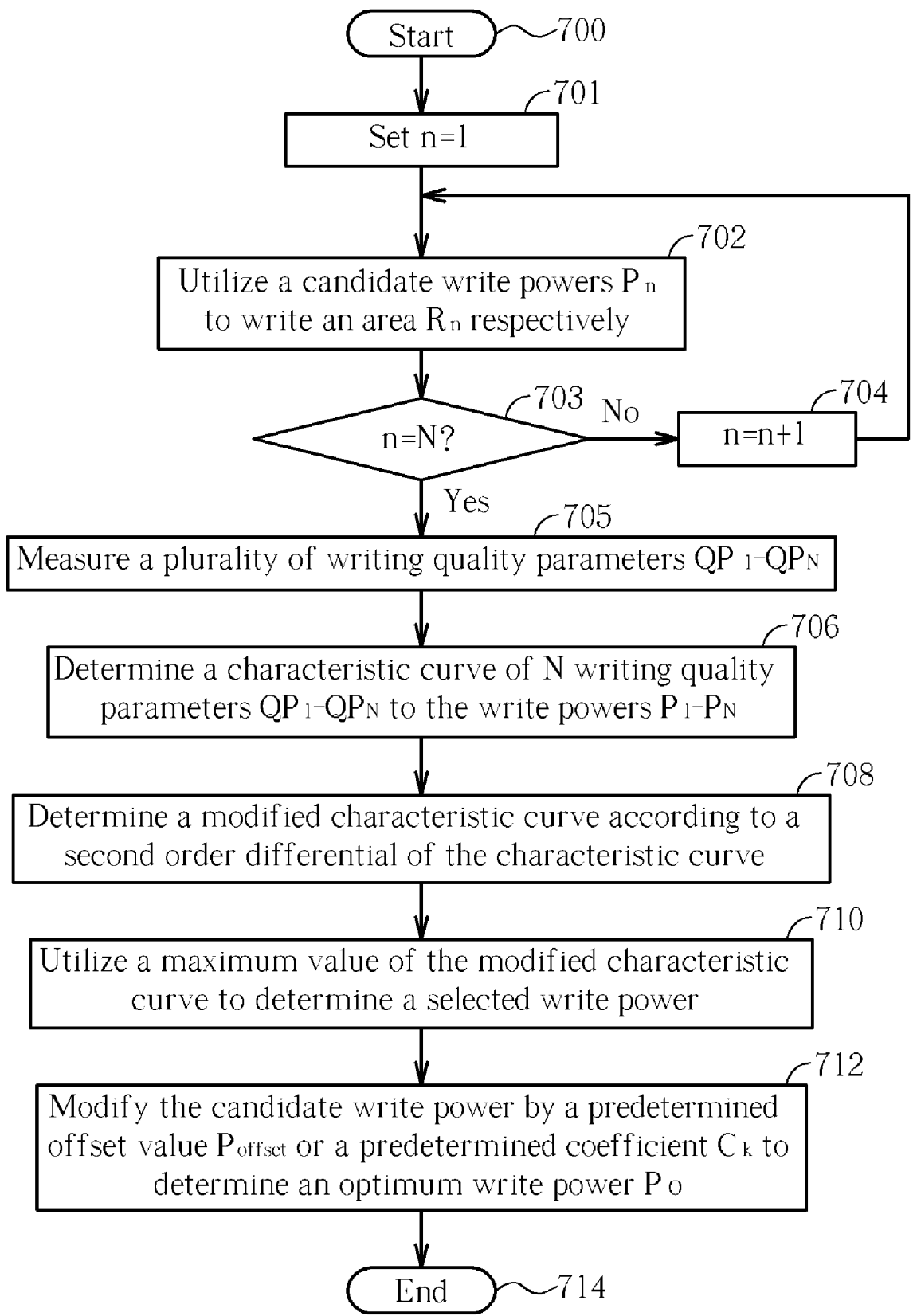
FIG. 7 is a flowchart illustrating a second embodiment of determining an optimum write power for an optical disc according to an embodiment of the present invention.

Please refer to FIG. 7. FIG. 7 is a flowchart illustrating a second method of determining an optimum write power for an optical disc 201 according to an embodiment of the present invention. In this embodiment, the second method of the present invention is applied to a writable optical disc complying with CD, DVD, Blu-ray Disc (BD) or HD-DVD specifications. However, the second method of the present invention is not limited to the above listed disc types. The operation of determining an optimum write power includes the following steps.

Step 700: Start.

Step 701: Set n=1;

Step 702: Utilize a candidate write powers $P_n$ to write patterns to an area $R_n$ respectively on the optical disc.

Step 703: Judge whether N candidate write powers haven been used to write N areas or not (n=N?). If yes, go to step 705. If no, go to step 704.

Step 704: Let n=n+1 and then proceed to step 702.

Step 705: Measure a plurality of writing quality parameters $QP_1$-$QP_N$ corresponding to the patterns written on each areas $R_1$-$R_N$ by write powers $P_1$-$P_N$.

Step 706: Determine a characteristic curve of N writing quality parameters $QP_1$-$QP_N$ to the write powers $P_1$-$P_N$.

Step 708: Determine a modified characteristic curve according to a second order differential of the characteristic curve.

Step 710: Utilize a maximum value of the modified characteristic curve to determine a selected write power.

Step 712: Modify the candidate write power by a predetermined offset value $P_{offset}$ or a predetermined coefficient $C_k$ to determine an optimum write power $P_O$.

Step 714: End.

The operation of the second method shown in FIG. 7 is similar to that of the first method illustrated in FIG. 3. The key difference is that the second method does not overwrite the areas $R_1$-$R_n$ by the write powers $P_1$-$P_n$. Therefore, the weighting operation is omitted accordingly. Compared with the first method, the second method can obtain the final write power $P_{wo}$ quickly.

The present invention provides a method to find the optimum write power according to a inflection point of a characteristic curve of writing quality parameters (jitter information or bit error rate information) to write powers. The present invention utilizing the characteristic curve of writing quality parameters to write powers can obtain an adequate write power for recording user data to the optical disc, regardless of whether the write strategy for an optical disc is adjusted. In addition, the found target write power does not significantly exceed the desired optimum write power. Therefore, the method can give consideration not only to write quality but also to the overwriting times of the rewritable optical disc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining an optimum write power for writing data to an optical disc, the method comprising:
   utilizing a plurality of candidate write powers for writing patterns onto areas of the optical disc, respectively, where each area is written and then overwritten at least once by the same candidate write power;
   for each area, measuring at least a writing quality parameter corresponding to each of the candidate write powers, respectively;
   determining a characteristic curve of the writing quality parameters to the candidate write powers; and
   determining the optimum write power according to a target inflection point of the characteristic curve.

2. The method of claim 1, wherein each of the writing quality parameters is determined by measuring jitter or bit error rate.

3. The method of claim 1, wherein determining the target power further comprises:
   determining a plurality of candidate inflection points of the characteristic curve; and
   selecting a candidate inflection point where the characteristic curve changes from concave down to concave up.

4. The method of claim 1, wherein determining the optimum write power further comprises:
   determining a modified characteristic curve according to a second order differential of the characteristic curve; and
   utilizing a maximum value of the modified characteristic curve to determine the target inflection point.

5. The method of claim 4, wherein the second order differential of the characteristic curve is performed in a continuous domain or a discrete domain.

6. The method of claim 1, wherein determining the optimum write power further comprises:
   determining the optimum write power by adding a predetermined offset value to a selected write power corresponding to the target inflection point of the characteristic curve.

7. The method of claim 1, wherein determining the optimum write power further comprises:
   determining the optimum write power by multiplying a predetermined coefficient and a selected write power corresponding to the target inflection point of the characteristic curve.

8. The method of claim 1, further comprising:
   before determining the characteristic curve, repeating the writing patterns step and the measuring step to get the overwriting quality parameters corresponding to each area.

9. The method of claim 8, further comprising:
   weighting the writing quality parameters of each overwriting in the same area to determine a final writing quality parameter of the candidate write power corresponding to the area, and the characteristic curve is determined according to the candidate write powers and final writing quality parameters thereof.

10. An optical disc drive capable of determining an optimum write power for writing data to an optical disc, the optical disc drive comprising:
    an optical pickup unit, utilizing a plurality of candidate write powers to write patterns onto areas of the optical disc, respectively, where each area is written and then overwritten at least once by the same candidate write power;
    a measuring module, coupled to the optical pickup unit, wherein for each area, the measuring module measures at least a writing quality parameter corresponding to each of the candidate write powers, respectively; and
    a write power controller, coupled to the optical pick-up head and the measuring module, for controlling the optical pickup unit to write data to the optical disc utilizing the candidate write powers, determining a characteristic curve of writing quality parameters to the candidate write powers, and determining the optimum write power according to a write power corresponding to a target inflection point of the characteristic curve.

11. The optical disc drive of claim 10, wherein the measuring module comprises a jitter measurer for determining each jitter value of corresponding to each of the candidate write powers.

12. The optical disc drive of claim 10, wherein the measuring module comprises a bit error rate measurer for determining bit error rate corresponding to each of the candidate write powers.

13. The optical disc drive of claim 10, wherein the write power controller further determines a plurality of candidate inflection points of the characteristic curve and selects a candidate inflection point where the characteristic curve changes from concave down to concave up.

14. The optical disc drive of claim 10, wherein the write power controller further determines a modified characteristic curve according to a second order differential of the characteristic curve and then utilizes a maximum value of the modified characteristic curve to determine the target inflection point.

15. The optical disc drive of claim 14, wherein the write power controller performs the second order differential of the characteristic curve in a continuous domain or a discrete domain.

16. The optical disc drive of claim 10, wherein the write power controller determines the optimum write power by adding a predetermined offset value to the write power corresponding to the target inflection point of the characteristic curve.

17. The optical disc drive of claim 10, wherein the write power controller determines the optimum write power by multiplying a predetermined coefficient and the write power corresponding to the target inflection point of the characteristic curve.

18. The optical disc drive of claim 10, wherein the write power controller repeats writing patterns on the same area and measuring the overwriting quality parameters corresponding to each area.

19. The optical disc drive of claim 18, wherein the write power controller weights the writing quality parameters of each overwriting in the same area to determine a final writing quality parameter of the candidate write power corresponding to the area, and the characteristic curve is determined according to the candidate write powers and final writing quality parameters thereof.

* * * * *